United States Patent [19]

Karube et al.

[11] Patent Number: 4,935,933
[45] Date of Patent: Jun. 19, 1990

[54] LASER OSCILLATOR DEVICE

[75] Inventors: Norio Karube, Machida; Akira Egawa, Minamitsuru; Mitsuo Manabe, Hachioji, all of Japan

[73] Assignee: Fanuc Ltd, Minamitsuru, Japan

[21] Appl. No.: 298,745

[22] PCT Filed: May 24, 1988

[86] PCT No.: PCT/JP88/00495
§ 371 Date: Jan. 12, 1989
§ 102(e) Date: Jan. 12, 1989

[87] PCT Pub. No.: WO88/09580
PCT Pub. Date: Dec. 1, 1988

[30] Foreign Application Priority Data

May 26, 1987 [JP] Japan .................. 62-128764

[51] Int. Cl.$^5$ .................................. H01S 3/00
[52] U.S. Cl. ...................... 372/38; 372/69; 372/82
[58] Field of Search .............. 372/81, 87, 83, 88, 372/69, 38, 82

[56] References Cited

FOREIGN PATENT DOCUMENTS

| 02938 | 4/1988 | Japan | 372/81 |
| 06809 | 9/1988 | Japan | 372/81 |
| 00776 | 1/1989 | Japan | 372/81 |

Primary Examiner—Léon Scott, Jr.
Attorney, Agent, or Firm—Staas & Halsey

[57] ABSTRACT

A laser oscillator device applies a high-frequency voltage to a plurality of discharge regions (1a, 1b) through a dielectric to produce a high-frequency discharge for laser pumping. The laser oscillator device includes high-frequency power supplies (26a, 26b) for converting a DC power supply into high-frequency power supply outputs, output transformers (22a, 22b) for boosting the high-frequency power supply outputs and transmitting high-frequency electric power to the discharge regions, the output transformers having secondary windings with grounded midpoints, and current detectors (CT1a, CT1b) for detecting currents flowing through discharge tubes. Output currents of the high-frequency power supplies are controlled by feeding back the detected currents. Since the detected currents are not affected by mutual currents between electrodes, alarm conditions due to uncontrollable operation of a feedback loop and damage of parts are prevented from occurring, and stable current control is achieved.

4 Claims, 7 Drawing Sheets

LASER OSCILLATOR DEVICE

DESCRIPTION

TECHNICAL FIELD

The present invention relates to a laser oscillator device for producing a high-power laser beam for cutting workpieces of metal or the like, and more particularly to a laser oscillator device capable of stable high-frequency discharge pumping and generating a laser output beam with improved instantaneous stability.

BACKGROUND ART

High-frequency discharge pumped axial-flow $CO_2$ lasers are in the process of being developed because of their advantages of high-power output and stable oscillation. One example of such laser is disclosed in Japanese Patent Application No. 61-243212 filed by the applicant.

A conventional axial-flow-type high-frequency discharge pumped laser oscillator device is illustrated in FIG. 10 of the accompanying drawings. The illustrated laser oscillator device includes a discharge tube 1 comprising four tube segments. However, the discharge tube 1 may have a desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6 serve to cool a laser gas heated by the discharge and the roots blower 7. The laser gas flows in the discharge tube 1 and gas delivery tubes in the directions of the arrows. Electrodes 8a, 8b~11a, 11b are connected to respective high-frequency power supplies 12, 13, 14, 15. The gas flows in the discharge tube 1 at the speed of about 100 m/second. An electric discharge is produced in the discharge tube 1 by a high-frequency voltage applied by the high-frequency power supplies 12~15 to generate laser oscillation.

The principles of a conventional high-frequency power supply are illustrated in FIG. 5 of the accompanying drawings. Denoted at 16 is a DC power supply, and 17 a high-frequency (RF) power supply. DC output from the DC power supply 16 is applied to the high-frequency power supply 17. The high-frequency power supply 17 comprises a branch circuit comprising four FETs 18~21, a boost transformer 22, and an impedance matching circuit 23. The output terminals of the high-frequency power supply 17 are coupled to the discharge tube 1 through electrodes 8a1, 8a2. A CT coil 24 serves to detect a current flowing through the discharge tube 1. A current feedback line 25 feeds back the detected current to control the current supplied to the discharge tube 1 to be constant.

The high-frequency discharge pumping laser has the following many advantages over the ordinary DC discharge pumping laser:

(i) Since it produces an electrodeless discharge, there is no problem of electrode material deterioration.

(ii) No ballast resistor is required.

(iii) There is no cathode fall, and high energy efficiency is obtained.

(iv) The laser can be operated at a low voltage and hence is safe for the operator.

(v) The dissociation ratio of $CO_2$, is low, and so is the running cost.

(vi) The laser has excellent pulse characteristics.

(vii) The laser device can be reduced in size.

(viii) The phenomenon of electron capture can be utilized by sufficiently increasing the frequency to obtain high efficiency.

(ix) The freedom of selection of discharge tube materials is high.

However, the current and voltage of the high-frequency discharge pumping laser tend to oscillate before and after a discharge is started, based on plasma coupling. Oscillation at about 1~10 Hz occurs when the discharge current in the discharge tube 1 is controlled by the feedback system shown in FIG. 5. As a result, various alarming conditions for the DC power supply 16 tend to take place, and the FETs 18~21 may be destroyed. In addition, the laser output is rendered unstable.

SUMMARY OF THE INVENTION

It is an object of the present invention to provide a high-frequency oscillator device which will solve the aforesaid problems and which will not produce alarming conditions for a DC power supply and also not destroy components such as FETs, and which generates a laser output beam with improved instantaneous stability.

According to a first embodiment, there is provided a laser oscillator device for applying a high-frequency voltage to a plurality of discharge regions through a dielectric to produce a high-frequency discharge for laser pumping, comprising:

high-frequency power supplies for converting a DC power supply into high-frequency power supply outputs;

output transformers for boosting said high-frequency power supply outputs and transmitting high-frequency electric power to the discharge regions, the output transformers having secondary winding midpoints grounded;

current detectors for detecting currents flowing through discharge tubes; and the arrangement being such that output currents of the high-frequency power supplies are controlled by feeding back the detected currents.

According to a second embodiment, there is provided a laser oscillator device for applying a high-frequency voltage to a plurality of discharge regions through a dielectric to produce a high-frequency discharge for laser pumping, comprising:

high-frequency power supplies for converting a DC power supply into high-frequency power supply outputs;

output transformers for boosting said high-frequency power supply outputs and transmitting high-frequency electric power to the discharge regions, the output transformers having secondary circuits not grounded and being connected to discharge tubes through impedance matching circuits;

current detectors for detecting currents flowing through the discharge tubes; and the arrangement being such that output currents of the high-frequency power supplies are controlled by feeding back the detected currents.

The aforesaid problems are caused by a mutual current between electrodes. The drawbacks will be described with reference to an arrangement having two electrodes for the sake of brevity. FIG. 6 shows a current flowing between electrodes. While a CT coil is omitted from illustration in the righthand circuit, the righthand circuit operates in the same manner as the lefthand circuit. Denoted at 1 is a discharge tube. High-frequency voltages are applied to electrodes $8a1$, $8a2$ and electrodes $8b1$, $8b2$ by high-frequency power supplies $26a$, $26b$, respectively.

It is assumed here that the high-frequency power supply $26a$ has a frequency f1, a voltage e1, and a phase $\phi 1$, and an inverter $26b$ has a frequency f2, a voltage e2, and a phase $\phi 2$. Rogowski coils are positioned as CT1, CT2, and CT3. Currents flowing through these three coils will be described. The following three discharge currents flow in the discharge tube 1:

In-tube discharge current = Id
Intertube coupling current = Is
Power supply loss current = Ir The discharge current Id is given by:
Id = e/Z where Z is the impedance between the discharge electrodes $8a$, ab and e is the voltage across the electrodes.

The intertube coupling current Is is a current flowing between the electrodes on the adjacent discharge tube segments. This current flows as a displacement current at a high frequency since ions remain in a downstream region of the gas. The current Is is difficult to control because the impedance z between the electrodes $8a1$, $8b1$ is abruptly reduced upon a transition from a glow discharge to an arc discharge due to unstable discharge property. The current Is is varied by the difference in phase between the voltages e1, e2.

The loss current Ir is a current drained from the power supply to ground and fed back to the circuit from the grounded point. Generally, the loss current Ir largely depends upon the temperature.

The currents flowing through the respective CTs can be determined as follows: [Current $I_{c1}$ of CT1]
$I_{c1}$ = Id + Is (when e1, e2 are in phase),
$I_{c1}$ = Id + 3Is (when e1, e2 are in opposite phase).
[Current $I_{c2}$ of CT2]
$I_{c2}$ = Id + Is (when e1, e2 are in phase),
$I_{c2}$ = Id (when e1, e2 are in opposite phase).
[Current $I_{c3}$ of CT3]
$I_{c3}$ = $I_{c1}$ + Ir.

These currents are plotted in FIG. 7. The graph of FIG. 7 has a horizontal axis representing the phase difference between the voltages e1, e2 and a vertical axis representing the values of the currents. The curves indicate the values of the currents $I_{c1}$, $I_{c2}$, $I_{c3}$, respectively. The current $I_{c3}$ is however indicated as a web-like curve having a certain width since the current varies with temperature.

[Operation of the first embodiment]

As is apparent from FIG. 7, even if the discharge current is constant, the values measured by the respective CTs vary. Therefore, if feedback control were effected with reference to the outputs from the CTs, then the discharge current would become unstable.

According to the present invention, the influence of the interference current (intertube coupling current) Is is eliminated by grounding the midpoints of the secondary windings of the output transformers $26a$, $26b$.

[Operation of the second embodiment]

The influence of the interference current Is flowing via ground is eliminated by disconnecting the secondary circuits of the transformers from ground.

DESCRIPTION OF THE PREFERRED EMBODIMENTS

Embodiments of the present invention will hereinafter be described in specific detail with reference to the drawings.

[First embodiment]

Figure 1:
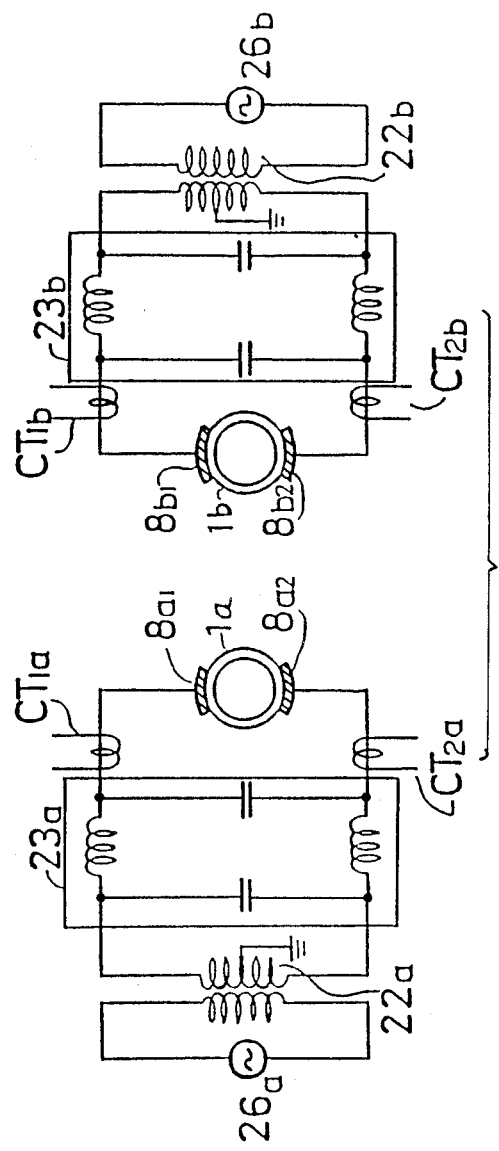
FIG. 1 is a circuit diagram of a first embodiment of the present invention.

FIG. 1 is a circuit diagram of a first embodiment. Denoted at $1a$, $1b$ are discharge tube segments adjacent to $CT1a$, $CT1b$, $CT2a$, are current detectors (Rogowski coils).

Figure 2:
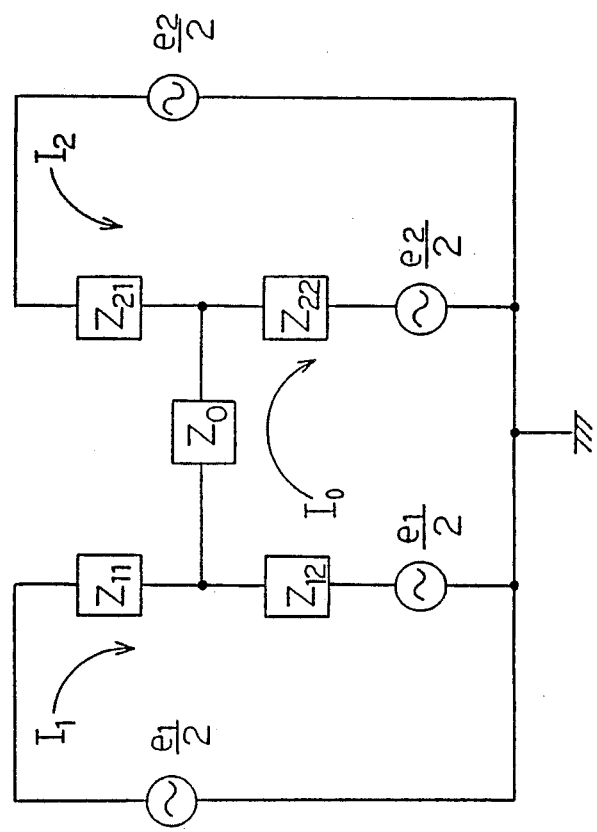
FIG. 2 is an equivalent circuit diagram of the circuit shown in FIG. 1.

The midpoints of the secondary windings of the output transformers $22a$, $22b$ are grounded. FIG. 2 shows an equivalent circuit of the circuit shown in FIG. 1. Designated at $I_1$ is a current flowing through a righthand circuit, $I_2$ a current flowing through a lefthand circuit, and $I_0$ an interference current between the righthand and lefthand circuits. Denoted at Z is an impedance of plasma coupling, at $Z_{11}$, $Z_{12}$ are two equally divided impedances of upper and lower portions of the lefthand circuit, and at Zhd 21, $Z_{22}$ are two equally divided impedances of upper and lower portions of the righthand circuit. From this equivalent circuit, the following impedance matrix is obtained:

$$|Z| = \begin{vmatrix} Zm & 0 & -Z_{12} \\ 0 & Zn & Z_{22} \\ -Z_{12} & Z_{22} & Zp \end{vmatrix}$$

where
$Zm = Z_{11} + Z_{12}$
$Zn = Z_{21} + Z_{22}$
$Zp = Z_{12} + Z_{22} + Z_0$ Based on the foregoing, the current flowing through the lefthand circuit shown in FIG. 1 is determined as follows:

$$I_1 = \begin{vmatrix} e_1 & 0 & -Z_{12} \\ e_2 & Z_n & Z_{22} \\ e_m & Z_{22} & Z_p \end{vmatrix} / |Z|$$

where $e_m = (e_1 - e_2)/2$. Therefore, $$I_1 = \{Z_n(3Z_{12}/2 + Z_o) + Z_{12}Z_{22}\}e_1 - Z_{12}(Z_{21} - Z_{22})e_2/2$$

Since the impedances $Z_{ij}$ are substantially equal to each other, the second term of the above equation is 0, and hence $I_1$ is not affected by $e_2$. Likewise, since $I_2$ is not affected by $e_1$, the circuits are not affected by any plasma coupling current, and no mutual interference current exists. As a result, oscillation is eliminated which would otherwise result from a mutual interference current, and semiconductors are prevented from destruction which would otherwise be caused by a current flowing out of control. Moreover, the instantaneous stability of a laser output beam is improved.

The impedance matching circuits 23a, 23b should preferably be of the balanced type.

[Second embodiment]

Figure 3:
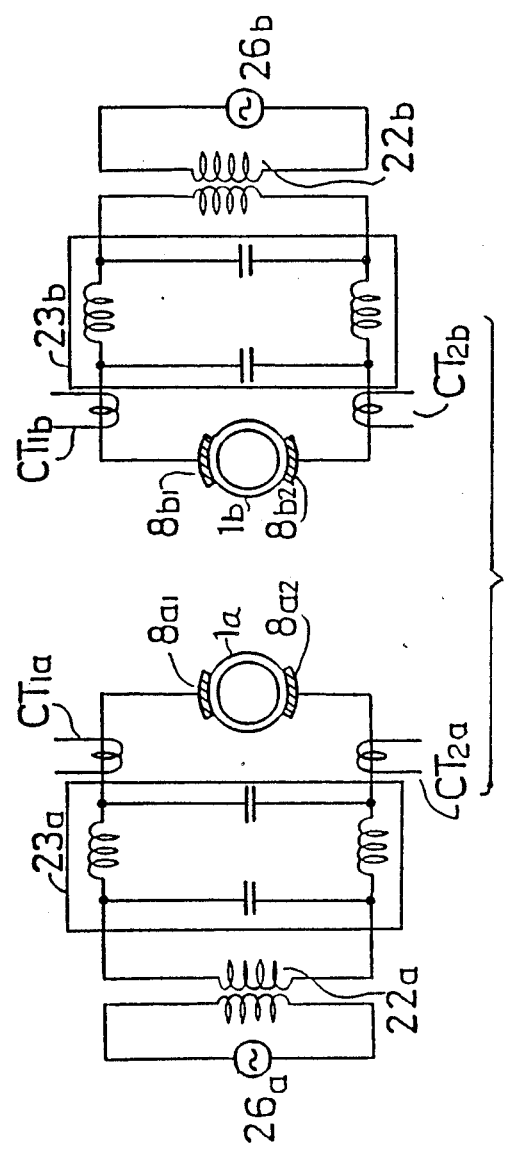
FIG. 3 is a circuit diagram of a second embodiment of the present invention.
Figure 4:
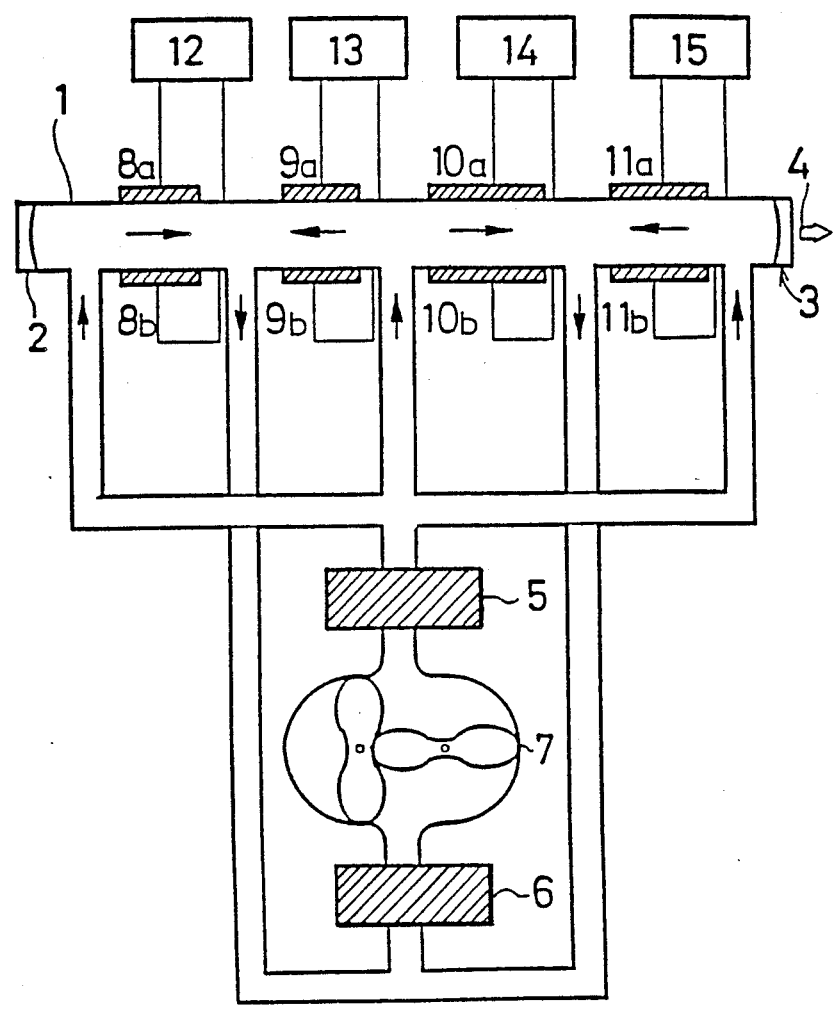
FIG. 4 is a view showing the principles of a conventional axial-flow RF discharge pumped laser oscillator device.
Figure 5:
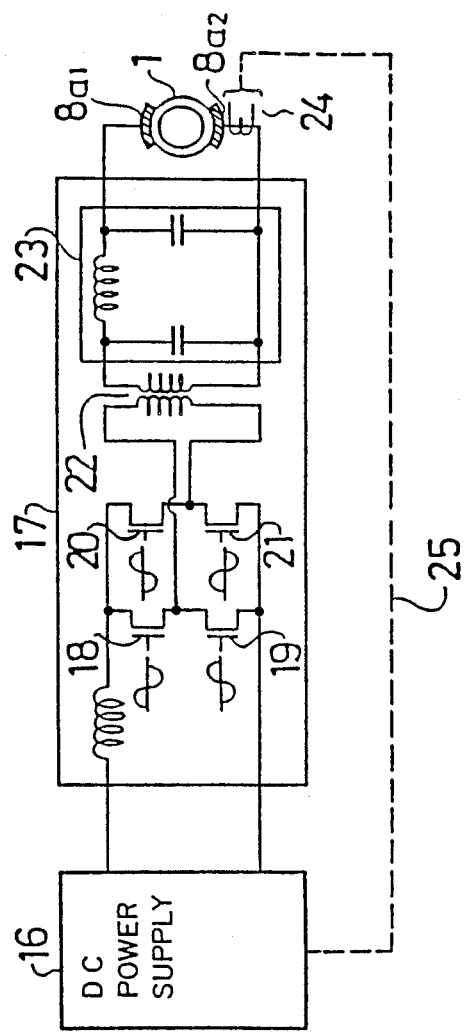
FIG. 5 is a view illustrating the principles of a conventional high-frequency power supply circuit for laser pumping.

FIG. 3 is a circuit diagram of a second embodiment. Those parts shown in FIG. 3 which are identical to those of FIG. 1 are designated by identical reference characters, and will not be described in detail.

Figure 6:
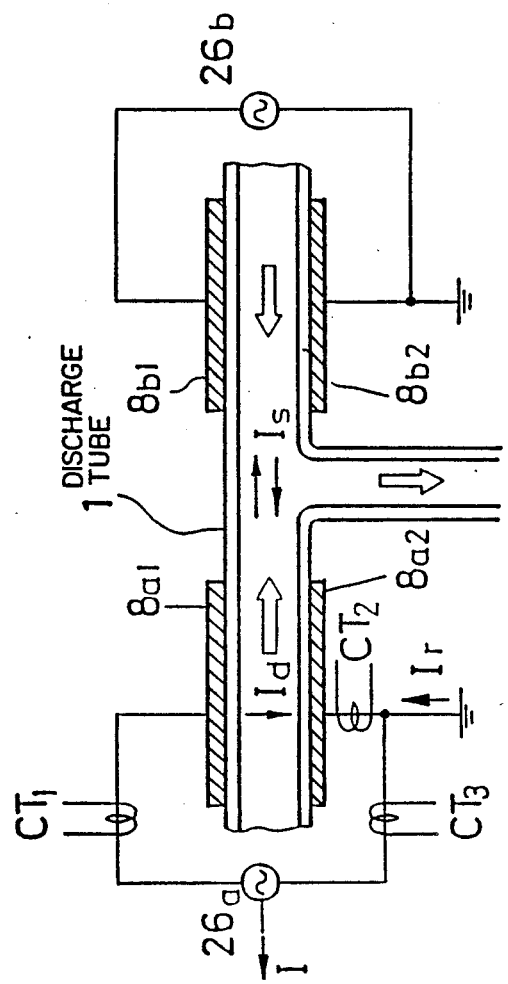
FIG. 6 is a view illustrating mutual currents flowing between two discharge tubes.
Figure 7:
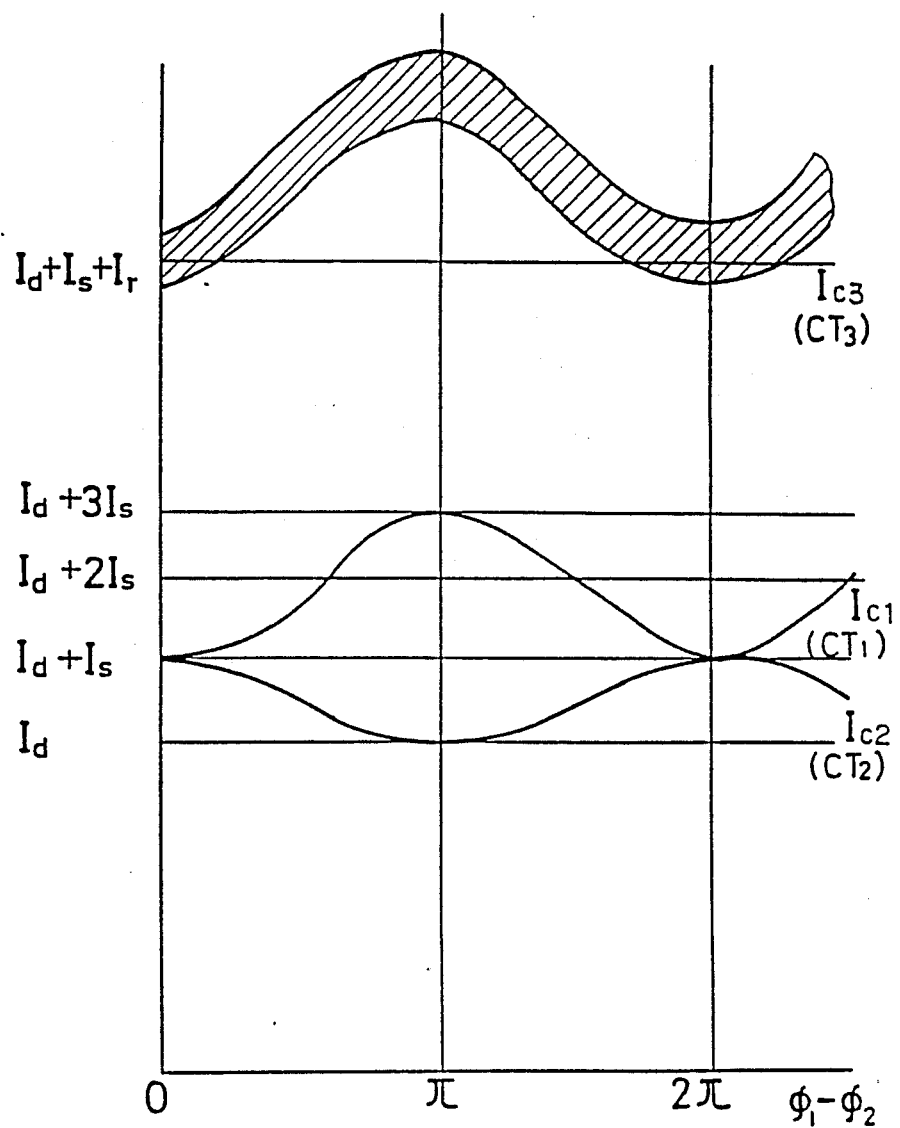
FIG. 7 is a graph showing the relationship between the currents and phases of current detectors.

In FIG. 3, the circuits including the impedance matching circuits 23a, 23b connected to the secondary windings of the output transformers are not grounded. Since the interference current Is would flow via the grounded secondary circuits as shown in FIG. 6, mutual interference between the lefthand and righthand secondary circuits can be eliminated by disconnecting these circuits from ground. No danger would be present by disconnecting the circuits from ground because the circuits shown in FIG. 3 have no active element but are passive circuits.

With the present invention, as described above, inasmuch as the device is not affected by mutual currents between the electrodes, various alarming conditions resulting from uncontrollable operation of the feedback loop and damage of semiconductor parts such as FETs are prevented from occurring, and stable current control can be performed. Moreover, the instantaneous stability of a laser output beam is improved.

We claim:

1. A laser oscillator device for applying a high-frequency voltage to a plurality of discharge regions of discharge tubes through a dielectric to produce a high-frequency discharge for laser pumping, comprising:
   high frequency power supply means for converting a DC power supply into high-frequency power supply outputs in accordance with a feedback signal;
   terminal means for connection to a ground potential;
   output transformer means for boosting said high-frequency power supply outputs and transmitting high-frequency electric power to the discharge regions, said output transformer means having secondary winding midpoints connected to said terminal means;
   current detector means for detecting currents flowing through discharge tubes; and
   means for providing the feedback signal in accordance with the detected currents.

2. A laser oscillator device according to claim 1, further comprising balanced impedance matching circuits respectively connected between said secondary windings of said output transformers and the discharge tubes.

3. A laser device for applying a high-frequency voltage to a plurality of discharge regions of discharge tubes through a dielectric to produce a high-frequency discharge for laser pumping, comprising:
   high frequency power supply means for converting a DC power supply into high-frequency power supply outputs in accordance with a feedback signal;
   output transformer means for boosting said high-frequency power supply outputs and transmitting high-frequency electric power tot he discharge regions, said output transformer means having secondary circuits;
   impedance matching circuit means, having an input operatively connected to said secondary circuits and an output connected to the discharge tubes, for matching an impedance at the input with an impedance at the output,
   current detectors for detecting currents flowing through said discharge tubes; and
   means for providing the feedback signal in accordance with the detected currents.

4. A laser oscillator device according to claim 3, wherein said impedance matching circuit means comprise balanced impedance matching circuits.

* * * * *

UNITED STATES PATENT AND TRADEMARK OFFICE
CERTIFICATE OF CORRECTION

PATENT NO. : 4,935,933
DATED : June 19, 1990
INVENTOR(S) : NORIO KARUBE et al.

It is certified that error appears in the above-identified patent and that said Letters Patent is hereby corrected as shown below:

Col. 4, line 38, "to CT1a," should be --each other; at 26a, 26b are high-frequency power supplies; at 22a, 22b are output transformers; at 23a, 23b are impedance matching circuits; and at CT1a;

line 46, "Z" should be --$Z_o$--.

Signed and Sealed this

First Day of October, 1991

Attest:

Attesting Officer

HARRY F. MANBECK, JR.

Commissioner of Patents and Trademarks